United States Patent [19]

Miyashita

[11] 4,224,727
[45] Sep. 30, 1980

[54] METHOD OF MAKING THE BODY OF A HYDRAULIC MASTER CYLINDER

[75] Inventor: Yukikazu Miyashita, Ueda, Japan

[73] Assignee: Nissin Kogyo Kabushiki Kaisha, Ueda, Japan

[21] Appl. No.: 909,661

[22] Filed: May 25, 1978

[30] Foreign Application Priority Data

Jun. 1, 1977 [JP] Japan .................... 52-64351
Mar. 24, 1978 [JP] Japan .................... 53-33686

[51] Int. Cl.³ ........................................... B23P 15/00
[52] U.S. Cl. ........................ 29/156.4 WL; 164/91; 164/98; 164/111; 29/527.5
[58] Field of Search ............ 29/401 A, 401 B, 401 D, 29/401 F, 401 R, 156.4 WL, 527.5; 164/91, 92, 98, 100, 106, 111

[56] References Cited
U.S. PATENT DOCUMENTS

| 731,748 | 6/1903 | Brinton | 164/111 |
| 1,682,590 | 8/1928 | Austin | 164/111 |
| 2,903,763 | 9/1959 | Grenell | 164/111 X |
| 3,073,290 | 1/1963 | Stump | 29/156.4 WL |
| 3,276,082 | 10/1966 | Thomas | 164/111 X |
| 4,122,596 | 10/1978 | Fields | 29/527.2 |

Primary Examiner—Carl E. Hall
Assistant Examiner—V. K. Rising
Attorney, Agent, or Firm—Haseltine, Lake & Waters

[57] ABSTRACT

A master cylinder body including a cylindrical-shaped inner section of uniform wall thickness formed as by die-casting and an outer section cast on the inner section around the periphery thereof. The extreme simplicity in configuration of the inner section enables it to be formed with no casting defects such as shrinkage cavities which may result in oil leakage therethrough. The inner section and the outer one cast thereon become solidly fused together at the cylindrical interface therebetween as long as the materials used are of the same metallurgical type. Formation of a multitude of annular or helical ridges on the outer periphery of the inner body section further ensures the solid interconnection between the two body sections.

4 Claims, 6 Drawing Figures

METHOD OF MAKING THE BODY OF A HYDRAULIC MASTER CYLINDER

BACKGROUND OF THE INVENTION

This invention relates to methods of making the body of a hydraulic master cylinder, particularly of the type used on automobiles, motorcycles and other vehicles as means for actuating a hydraulic brake system or a clutch assembly.

In general, the body of a hydraulic master cylinder is complicated in shape and not uniform in wall thickness and, even when formed by die-casting, such cylinder body tends to include localized shrinkage cavities. Should shrinkage cavities be formed in the bore wall section of the cylinder body, the piston cup, fitted to slide over the bore wall surface, must be injured by any sharp edge of the cavities and its sealing capacity impaired. Also, formation of such cavities results in loss of oil-tightness of the bore wall itself, possibly allowing hydraulic oil to leak through the cavities when the oil pressure in the bore is raised. In an attempt to overcome such inconveniences, it has previously been proposed to incorporate a length of steel pipe, which is highly impervious to hydraulic oil, in the casting of a master cylinder body as an insert in order to define a cylinder bore therein as the hollow interior of the steel pipe. However, as the cylinder body is usually cast from an aluminum alloy, which is quite different in nature from steel, a more or less clearance inevitably forms at the interface between the cylinder body and the steel pipe insert on account of the difference in coefficient of thermal expansion and the limited adhesion between the two materials. In use of such cylinder body the clearance tends to cause oil leakage, communicating with oil passages, such as vent and replenishing ports interconnecting the cylinder bore and an oil reservoir formed integral with the cylinder body.

SUMMARY OF THE INVENTION

The present invention is designed to realize a master cylinder body of novel structure which is free from the difficulties previously encountered in the art as described above and has for its object the provision of a method of making such master cylinder body which enables efficient and stable production thereof.

According to the present invention, there is provided a method of making the body of a hydraulic master cylinder which comprises at least the steps of: forming a cylindrically shaped inner body section of substantially uniform wall thickness at all parts thereof and having a cylinder bore defined therein; and casting an outer body section on said inner body section around the outer periphery thereof from a material substantially the same as that of said inner body section so that said inner and outer body sections become closely fused to each other at the cylindrical interface therebetween.

The above and other objects, features and advantages of the present invention will become apparent from the following description when taken in conjunction with the accompanying drawings, which illustrate a few preferred embodiments of the invention.

DESCRIPTION OF THE PREFERRED EMBODIMENTS

Figure 1:
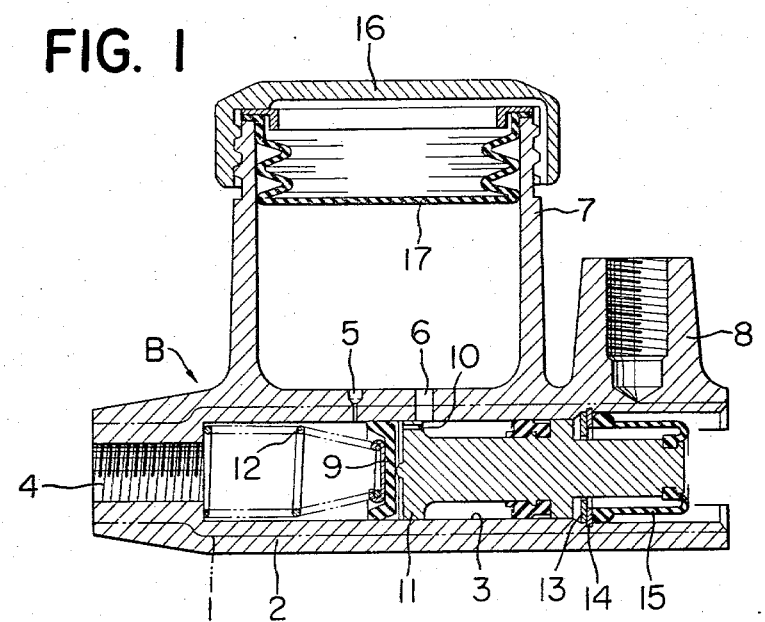
FIG. 1 is a side elevational vertical cross section of the whole assembly of a hydraulic master cylinder which includes a cylinder body made by the method of the present invention.

Description will first be made with reference to FIG. 1, which illustrates the whole assembly of a brake master cylinder for motorcycle use, made in accordance with the present invention. As illustrated, the body B of the master cylinder has defined therein a cylinder bore 3 and an output port 4 communicating with the bore at the front end thereof. Formed on top of the cylinder body B integrally therewith are an oil reservoir 7 in which brake oil is held and a boss 8 for supporting a post (not shown) on which a back mirror is mounted. The oil reservoir 7 is held in fluid communication with the cylinder bore 3 through a vent port 5 and a replenishing port 6.

Accommodated in the cylinder bore 3 are a piston 11 fitted with a piston cup 9 on the front end face thereof and a restoring spring 12 normally urging the piston 11 rearwardly or to the right, as viewed in FIG. 1. The piston 11 is formed with a through hole 10 which extends rearwardly from the front end face of the piston. Secured to the wall of the cylinder bore 3 are a stop plate 13 and a circlip 14 which cooperate to define the rear limit of retracting movement of the piston 11. A dust-preventive boot 15 of rubber or the like elastomeric material is arranged in the cylinder bore 3 between the bore wall portion adjacent to the circlip 14 and the periphery of piston 11 at its rear end.

In FIG. 1, reference numeral 16 indicates a cover of oil reservoir 7; and 17 a diaphragm for shielding the brake oil held in the oil reservoir 7 from atmospheric air.

In operation, when the brake lever (not shown) is actuated so as to push the piston 11 forwardly (to the left, as viewed in FIG. 1), the oil pressure in the front oil chamber, that is, the bore space on the front side of piston 11, is raised as soon as the vent port 5 is closed by the piston cup 9 and the oil pressure is fed through the outlet port 4 into the wheel cylinders to actuate the wheel brakes.

Subsequently, when the brake lever is released, the piston 11 is allowed to retract under the bias of restoring spring 12 so that brake oil is drawn from the oil reservoir 7 into the cylinder bore 3 through the replenishing port 6 and the front oil chamber is replenished with oil proceeding through the through hole 10, formed in the piston 11 at its front end, and further over the outer periphery of the piston cup 9.

Description will next be made of the method of manufacture of the present invention as applied to the making of the body B of the brake master cylinder shown and described above.

Though the master cylinder is generally constructed as described above, it is to be noted that its body B is made, according to the present invention, in two sections, inner and outer, as will be described below in detail.

Figure 2:
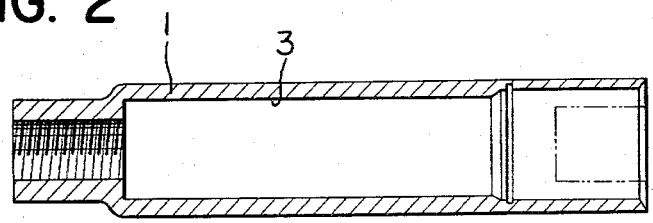
FIG. 2 is a detached view, in side elevational cross section, of the inner section of the cylinder body shown in FIG. 1.

As shown in FIG. 2, the inner section 1 of the cylinder body is cylindrically shaped and substantially uniform in wall thickness at all parts thereof and has a cylinder bore defined therein, as indicated at 3. The inner body section 1 thus formed is set within a body-forming metal mold in a predetermined position and the other, outer body section 2 (FIG. 1), including oil reservoir 7 and boss 8, is formed as by die-casting on the inner body section 1 set in the metal mold from the same material as that of the inner body section 1 or a material similar thereto in metallurgical structure. In this manner, the inner body section 1 is incorporated in the casting operation as an inside insert around which the outer body section 2 is formed and, because of the materials used, which are of the same type, the inner and outer sections 1 and 2 become closely fused to each other at the cylindrical interface therebetween to form an integral body structure.

Subsequently, vent port 5 and replenishing port 6 are formed by drilling through the adjacent walls of the inner and outer body sections 1 and 2 to complete the cylinder body B shown in FIG. 1.

Figure 3:
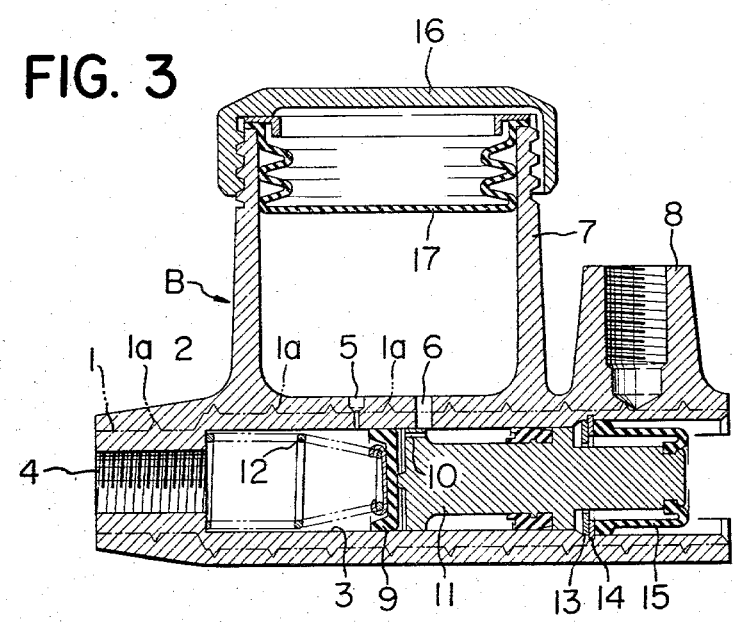
FIG. 3 is a view similar to FIG. 1, illustrating another master cylinder assembly, which includes a modified form of cylinder body made according to the method of the present invention.

FIG. 3 illustrates another embodiment of the present invention, which includes a modified form of inner body section 1. Specifically, the inner body section 1 in this embodiment is formed on the outer peripheral surface thereof with a multitude of integral ridges 1a which extend around the periphery of the body section 1 in encircling relation thereto. It is to be noted that these ridges 1a may be formed simultaneously with the inner body section 1 itself or subsequently in a separate step. The outer body section 2 is formed as by die-casting on the inner body section 1, with ridges 1a formed thereon, from the same material as that of the latter in quite the same manner as described with the previous embodiment to form an integral body structure, which is worked again in the same manner as previously described to complete the cylinder body.

Figure 4:
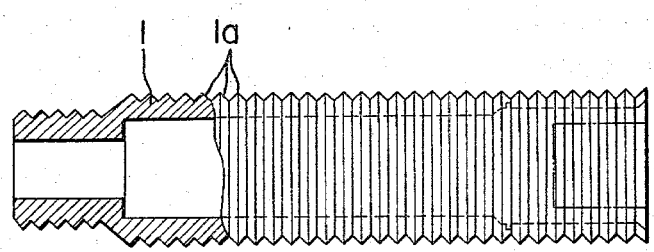
FIGS. 4 to 6 are views similar to FIG. 2, respectively illustrating further forms of inner body section.
Figure 5:
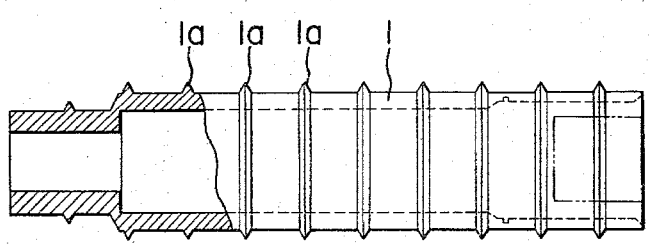
Figure 6:
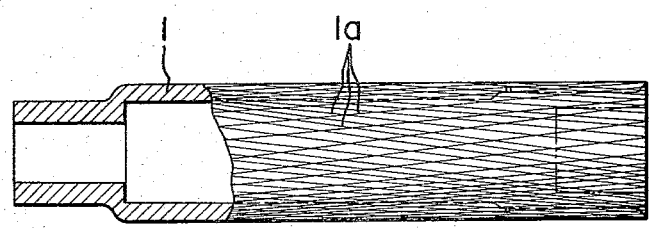

The configuration of the ridges 1a, formed on the inner body section 1 integrally therewith, may take various forms, as illustrated in FIGS. 4, 5 and 6. FIGS. 4 and 5 illustrate annular ridges 1a extending circumferentially around the periphery of the inner body section 1 which are formed closely adjacent to each other and axially spaced at regular intervals, respectively. FIG. 6 illustrates ridges 1a formed as diamond or double helical knurls on the inner body section by knurling.

It will be readily recognized that the ridges 1a of either form, having themselves only a limited heat capacity, effectively help enable the inner body section 1 with such ridges formed thereon and the outer body section 2 as cast on the inner section to become solidly fused together throughout the cylindrical interface therebetween.

In practicing the present invention, it is desirable to use an aluminum alloy of particularly high purity as a material for the inner body section 1, which is required to exhibit a high corrosion resistance.

Examples of said high purity materials for the inner and outer body sections are an aluminum alloy of JIS-6063 and an aluminum alloy of JIS-ADC 12, respectively, of which compositions are as follows:

|  | Si | Fe | Cu | Mn |
|---|---|---|---|---|
| JIS-6063 for inner body | 0.2-0.6 | 0.35 or less | 0.1 or less | 0.1 or less |
| JIS-ADC 12 for outer body | 9.0-12 | 1.3 or less | 1.5-3.5 | 0.5 or less |

|  | Mg | Cr | Zn | Ti |
|---|---|---|---|---|
| JIS-6063 for inner body | 0.45-0.9 | 0.1 or less | 0.1 or less | 1.0 or less |
| JIS-ADC 12 for inner body | 0.3 or less | 1.0 or less | — | — |

|  | Ni | Sn | Others | Al |
|---|---|---|---|---|
| JIS-6063 for inner body | — | — | 0.15 or less | rest |
| JIS-ADC 12 for outer body | 0.5 or less | 0.3 or less | — | rest |

To summarize, in the method of making a master cylinder body according to the present invention, first an inner body section which is cylindrically shaped and substantially uniform in wall thickness at all parts thereof and has a cylinder bore defined therein is formed and then an outer body section is cast on the inner body section to complete a cylinder body. The inner body section is highly moldable because of its simple configuration and this makes it possible to prevent occurrence of any casting defects such as shrinkage cavities, which may result in reduction in oil-tightness of the cylinder bore wall and impairment of the piston cup.

The outer body section is cast on the inner body section from a material of the same metallurgical type as that of the latter so that the body sections become fused together at the interface therebetween and there is no occurrence of any clearance or interstices as usually found between cast material differing in coefficient of thermal expansion. Owing to this, the walls of oil passages such as vent and replenishing ports formed through the adjoining walls of of the body sections are at all times held oil-tight as well as the wall of the cylinder bore and any leakage of hydraulic oil upon brake application is effectively prevented. It will thus be understood that, according to the present invention, master cylinder bodies of particularly high quality can be produced efficiently in a consistent manner.

According to a further feature of the present invention, the inner body section is formed on its outer peripheral surface with a multitude of ridges and on such inner body section is cast the outer body section of the same material. The ridges, being limited in heat capacity, enable the inner body section to be closely fused to the outer body section at all times without fail. Even if any satisfactory fusion were not obtained in that region of the interface between the body sections where oil passages such as vent and replenishing ports are subsequently formed, any oil permeation between the oil passages and the external surface of the cylinder body is precluded by the ridges fully fused at the interface between the body sections and thus the oil-tightness of the oil passage walls and hence the quality and performance of the resulting master cylinder body are improved to a substantial extent.

I claim

1. A method of making the body of a hydraulic master cylinder comprising the steps of: forming a cylindrically shaped inner body section of substantially uniform wall thickness at all parts thereof, having a cylinder bore therein; casting an outer body section on said inner body section around the outer periphery thereof said outer body section having an oil reservoir intergrally formed therein, from a material substantially the same as that of said inner body section, whereby, said inner and outer body sections fuse to one another at the cylindrical interface therebetween and forming port means through said outer and inner body sections for communication between the interior of said reservoir and the cylinder bore of said inner body section.

2. A method as set forth in claim 1, further comprising the steps of: forming a multitude of integral ridges on said inner body section around the outer periphery thereof, before said outer body section is cast on said inner body section.

3. A method as set forth in claim 2, wherein: said ridges are annular, extending circumferentially around said inner body section.

4. A method as set forth in claim 2, wherein: said ridges are in the form of double helical knurls.

* * * * *